(12) United States Patent
Meiyappan et al.

(10) Patent No.: US 6,311,248 B1
(45) Date of Patent: Oct. 30, 2001

(54) METHOD AND SYSTEM FOR OPTIMIZED DATA TRANSFERS IN A MIXED 64-BIT/32-BIT PCI ENVIRONMENT

(75) Inventors: Subramanian S. Meiyappan, Tempe; Peter Chambers, Phoenix, both of AZ (US)

(73) Assignee: VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/291,402

(22) Filed: Apr. 13, 1999

(51) Int. Cl.[7] ............................ G06F 13/14; G06F 13/364
(52) U.S. Cl. .................................. 710/127; 710/66
(58) Field of Search ............................ 710/127, 126, 710/128, 129, 66

(56) References Cited

U.S. PATENT DOCUMENTS

| 5,533,204 | 7/1996 | Tipley . |
| 5,761,443 | 6/1998 | Kranich . |
| 6,230,216 | * 5/2001 | Chambers et al. ............... 710/4 |
| 6,233,632 | * 5/2001 | Meiyappan et al. .............. 710/66 |

FOREIGN PATENT DOCUMENTS

0872799A2   10/1998   (EP) ............................ G06F/13/36

* cited by examiner

*Primary Examiner*—Glenn A. Auve
(74) *Attorney, Agent, or Firm*—Wagner Murabito & Hao LLP

(57) ABSTRACT

A method for optimizing the performance of a 64-bit PCI initiator when transferring a 64-bit data via a 64-bit PCI bus. The 64-bit PCI initiator receives a single 64-bit data for transfer via the 64-bit PCI bus. The 64-bit PCI initiator breaks the 64-bit data into a first 32-bit data and a second 32-bit data. The 64-bit initiator then initiates a data transaction with the target device arbitrating for ownership of the 64-bit PCI bus. Upon receiving ownership of the 64-bit PCI bus, the 64-bit PCI initiator transfers the first 32-bit data and then transfers the second 32-bit data to the target device via the 64-bit PCI bus. The first 32-bit data and the second 32-bit data are transferred by the 64-bit PCI initiator to the target device without the assertion of a REQ64# signal, such that a REQ64# ACK64# protocol is avoided, enabling a more efficient completion of the data transaction.

20 Claims, 8 Drawing Sheets

METHOD AND SYSTEM FOR OPTIMIZED DATA TRANSFERS IN A MIXED 64-BIT/32-BIT PCI ENVIRONMENT

TECHNICAL FIELD

The present invention pertains to the field of computer system bus architectures. More particularly, the present invention relates to a method and system for optimizing data transfers in a mixed 64-bit/32-bit PCI environment.

BACKGROUND ART

A bus architecture of a computer system conveys much of the information and signals involved in the computer system's operation. In a typical computer system, one or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. With many peripheral devices, such as graphics adapters, full motion video adapters, small computer systems interface (SICS) host bus adapters, and the like, it is imperative that large block data transfers be accomplished expeditiously. These applications are just some examples of subsystems that benefit substantially from a very fast bus transfer rate.

Much of a computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose. The electronics industry has, over time, developed several types of bus architectures. Recently, the PCI (peripheral component interconnect) bus architecture has become one of the most widely used, widely supported bus architectures in the industry. The PCI bus was developed to provide a high speed, low latency bus architecture from which a large variety of systems could be developed.

Prior Art FIG. 1 shows a typical PCI bus architecture 100. PCI bus architecture 100 is comprised of a CPU 102 and a main memory 104, coupled to a host PCI bridge containing arbiter 106 (hereafter arbiter 106) through a CPU local bus 108 and memory bus 110, respectively. A PCI bus 112 is coupled to each of PCI agents 114, 116, 118, 120, 122, 124 respectively, and is coupled to arbiter 106.

Referring still to Prior Art FIG. 1, each of PCI agents 114, 116, 118, 120, 122, 124 (hereafter, PCI agents 114–124) residing on PCI bus 112 use PCI bus 112 to transmit and receive data. PCI bus 112 is comprised of functional signal lines, for example, interface control lines, address/data lines, error signal lines, and the like. Each of PCI agents 114–124 are coupled to the functional signal lines comprising PCI bus 112. When one of PCI agents 114-124 requires the use of PCI bus 112 to transmit data, it requests PCI bus ownership from arbiter 106. The PCI agent requesting ownership is referred to as an "initiator", or bus master. Upon being granted ownership of PCI bus 112 from arbiter 106, the initiator (e.g., PCI agent 116) carries out its respective data transfer.

Each of PCI agents 114–124 may independently request PCI bus ownership. Thus, at any given time, several of PCI agents 114–124 may be requesting PCI bus ownership simultaneously. Where there are simultaneous requests for PCI bus ownership, arbiter 106 arbitrates between requesting PCI agents to determine which requesting PCI agent is granted PCI bus ownership. When one of PCI agents 114–124 is granted PCI bus ownership, it initiates it transaction (e.g., data transfer) with a "target " or slave device (e.g., main memory 104). When the data transaction is complete, the PCI agent relinquishes ownership of the PCI bus, allowing arbiter 106 to reassign PCI bus 112 to another requesting PCI agent.

Thus, only one data transaction can take place on a PCI bus at any given time. In order to maximize the efficiency and data transfer bandwidth of PCI bus 112, PCI agents 114–124 follow a definitive set of protocols and rules. These protocols are designed to standardize the method of accessing, utilizing, and relinquishing PCI bus 112, so as to maximize its data transfer bandwidth. The PCI bus protocols and specifications are set forth in an industry standard PCI specification (e.g., PCI Specification—Revision 2.1). Where each of PCI agents 114–124 are high performance, well designed devices, data transfer rates of up to 528 Mbytes per second can be achieved (e.g., PCI bus 112 operating at 66 MHz).

Prior art FIG. 2 shows a diagram of arbiter 106, PCI bus 112, PCI target 114, and PCI target 116 in greater detail. As depicted in FIG. 2, PCI bus 112 is a 64-bit PCI bus (in accordance with PCI specification—Revision 2.1). However, PCI bus 112 hosts a mixed 32-bit and 64-bit PCI environment. PCI target 114 is a 64-bit PCI device, while PCI target 116 is a 32-bit PCI device. In accordance with the PCI specification, a 64-bit PCI bus (e.g., 64-bit PCI bus 112) must be fully functional and adequately host both 32-bit and 64-bit PCI devices. With both 32-bit and 64-bit devices coupled to a common 64-bit PCI bus (e.g., 64-bit PCI bus 112), a 64-bit PCI initiator, when it starts a cycle, is required to determine the width of the target (e.g., whether the target device is a 32-bit or 64-bit device), by asserting the REQ64# signal and waiting for the ACK64# signal being asserted with DEVSEL# by the target device. If the target device asserts ACK64# with DEVSEL#, then the target device is notifying the initiator that it is a 64-bit device. If ACK64# is not asserted with DEVSEL#, then the 64-bit initiator determines that the target device is a 32-bit device.

Thus, once the 64-bit PCI initiator 106 determines that the target device 116 is a 32-bit PCI target, the 64-bit PCI initiator 106 performs "data-steering" to transfer the data from its data transaction 32-bits at a time. However, there exists a problem in the fact that single data transaction 64-bit transfers are very inefficient using this scheme.

As is well known, using a single data phase with 64-bit transfers may not be very effective. Since the 64-bit PCI initiator 106 does not know how the transaction will be resolved with ACK64# until DEVSEL# is returned, it does not know the clock on which to deasseirt FRAME# for a 64-bit single dataphase transaction. IRDY# must remain deasserted, until FRAMES signaling is resolved. The single 64-bit data phase may have to be split into two 32-bit data phases when the target is only 32-bits, which means a two phase 32-bit transfer is a least as fast as a one phase 64-bit transfer.

Prior art FIG. 3 shows a timing diagram 300 of 64-bit PCI initiator 106 transferring a 64-bit data, using the REQ64#, ACK64# protocol, to 64-bit PCI target 114. The left side of timing diagram 300 shows the standard signals of 64-bit PCI bus 112. The letter "Z" signifies that the relevant signal lines are tri-stated. As shown by arrows 301, it should be noted that until ACK64# is sampled asserted by 64-bit PCI initiator 106, FRAME# cannot be deasserted and IRDY# cannot be asserted, which causes a 3-clock cycle data transfer transaction, when there is only one 64-bit data to transfer.

Prior art FIG. 4 shows a timing diagram 400 of 64-bit PCI initiator 106 transferring a 64-bit data, using the REQ64#, ACK64# protocol, to a 32-bit PCI target 116. Diagram 400 shows a case where 64-bit PCI initiator 106 transfers a 64-bit data to 32-bit PCI target 116. As shown in diagram 400, when 64-bit PCI initiator 106 samples that the ACK64# is not asserted with DEVSEL#, the initiator knows that the target is a 32-bit target and that it has to burst the 64-bit data as two 32-bit data transfers. This is shown by the assertion of FRAME# with IRDY#. ACK64# is never asserted by 32-bit PCI target 116. This causes a four clock cycle data transfer transaction to transfer a 64-bit data to a 32-bit target through the REQ64#, ACK64# protocol.

Thus, what is required is a more efficient solution for transferring 64-bit data in a mixed 64-bit/32-bit PCI environment. What is required is a solution which allows more efficient transfers of 64-bit data from a 64bit PCI initiator device to a 64-bit target device in a mixed 64-bit/32-bit PCI environment. Additionally, what is further required is a solution which allows more efficient transfers from a 64-bit initiator device to a 32-bit target device in a mixed 64-bit/32-bit PCI environment.

DISCLOSURE OF THE INVENTION

The present invention provides a more efficient solution for transferring 64-bit data in a mixed 64-bit/32-bit PCI environment. The present invention allows more efficient transfers of 64-bit data from a 64-bit PCI initiator device to a 64-bit target device in a mixed 64-bit/32-bit PCI environment. Additionally, the present invention allows more efficient transfers from a 64-bit initiator device to a 32-bit target device in a mixed 64-bit/32-bit PCI environment.

In one embodiment, the present invention is implemented as a method for optimizing the performance of a 64-bit PCd initiator when transferring a 64-bit data via a 64-bit PCI bus. The 64-bit PCI bus presents a mixed 64-bit/32-bit PCI environment, wherein the 64-bit PCI bus hosts both 64-bit PCI devices and 32-bit PCI devices. The optimization provides for more efficient transfers of single 64-bit data (two 32-bit words) from a 64-bit PCI initiator to target devices on the bus. In accordance with present invention, the single 64-bit data is broken into a first and second 32-bit data, and transferred in two successive clock cycles.

For example, the 64-bit PCI initiator receives a single 64-bit data (e.g., from an internal device) for transfer via the 64-bit PCI bus. The 64-bit PCI initiator breaks the 64-bit data into a first 32-bit data and a second 32-bit data. The 64-bit initiator then initiates a data transaction with the target device by arbitrating for ownership of the 64-bit PCI bus, in accordance with standard PCI protocols. Upon receiving ownership of the bus, the 64-bit PCI initiator asserts IRDY# with FRAME#, and transfers the first 32-bit data and then transfers the second 32-bit data to the target device in successive clock cycles. The first 32-bit data and the second 32-bit data are transferred by the 64-bit PCI initiator to the target device without the assertion of a REQ64# signal, such that a REQ64# ACK64# protocol (e.g., as required by the PCI specification in a mixed 64-bit/32-bit PCI environment) is avoided.

By eliminating the REQ64# ACK64# protocol, the optimization of the present invention enables a more efficient completion of the data transaction. In this manner, the 64-bit PCI initiator executes more efficient transfers of 64-bit data to other 64-bit target devices and more efficient 64-bit transfers to other 32-bit target devices in the mixed 64-bit/32-bit PCI environment.

BRIEF DESCRIPTION OF THE DRAWINGS

The accompanying drawings, which are incorporated in and form a part of this specification, illustrate embodiments of the invention and, together with the description, serve to explain the principles of the invention.

Prior art

Prior art

Prior art

Prior art

BEST MODE FOR CARRYING OUT THE INVENTION

Reference will now be made in detail to the preferred embodiments of the invention, a method and system for optimized data transfers in a mixed 64-bit/32-bit PCI environment, examples of which are illustrated in the accompanying drawings. While the invention will be described in conjunction with the preferred embodiments, it will be understood that they are not intended to limit the invention to the these embodiments. On the contrary, the invention is intended to cover alternatives, modifications, and equivalents, which may be included within the spirit and scope of the invention as defined by the appended claims. Furthermore, and the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The present invention provides a more efficient solution for transferring a 64-bit data in a mixed 64-bit/32-bit PCI environment. In accordance with present invention, the single 64-bit data is broken into a first and second 32-bit data, and transferred in two successive clock cycles. In so doing, the present invention allows more efficient transfers of 64-bit data from a 64-bit PCI initiator device to a 64-bit target device in a mixed 64-bit/32-bit PCI environment.

Additionally, the present invention allows more efficient transfers from a 64-bit initiator device to a 32-bit target device in a mixed 64-bit/32-bit PCI environment. The present invention and its benefits are discussed in greater detail below.

Figure 1:
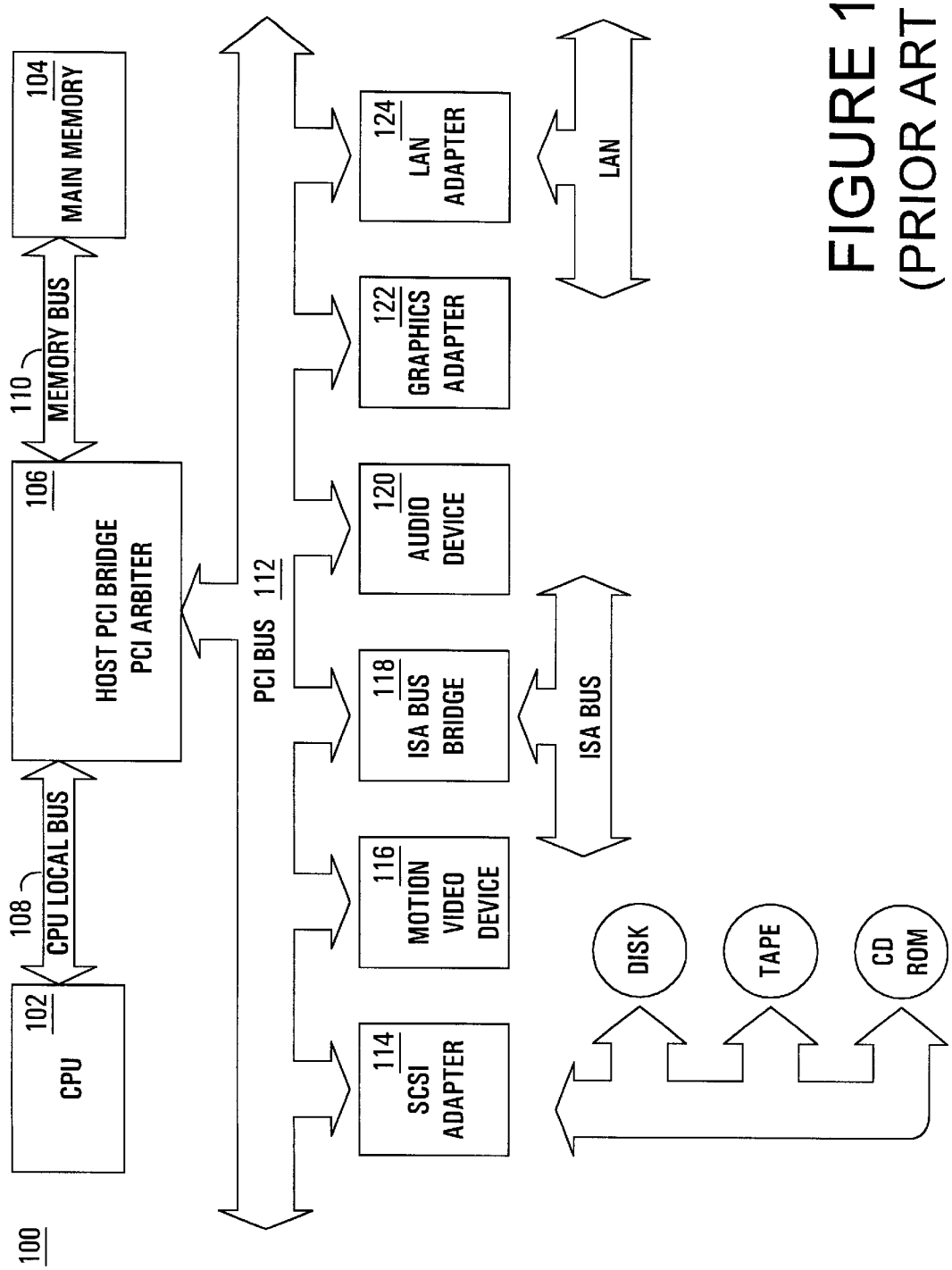
FIG. 1 shows a typical PCI bus architecture of the prior art.
Figure 2:
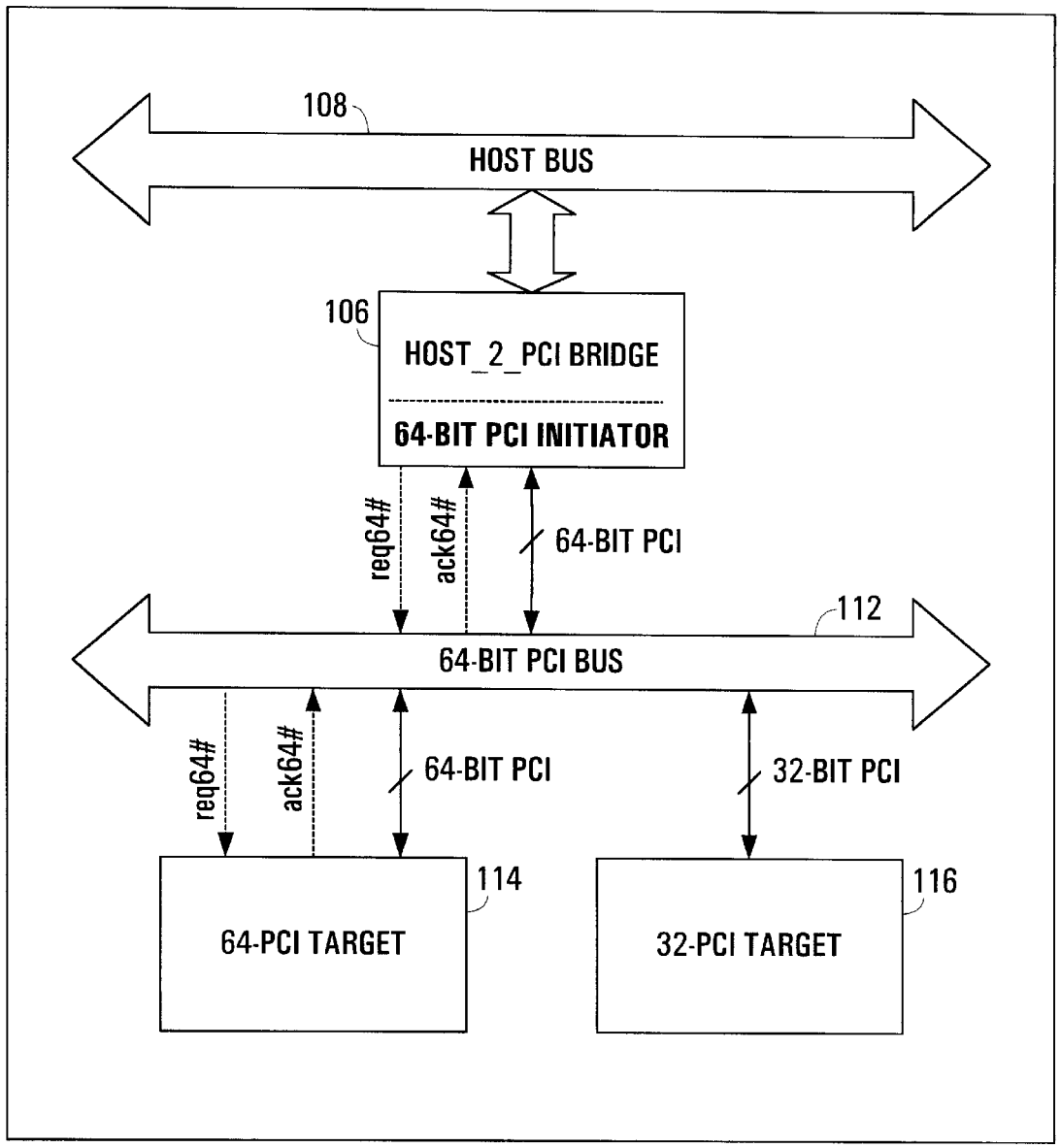
FIG. 2 shows a diagram of selected components of the PCI bus architecture of FIG. 1 in greater detail.
Figure 3:
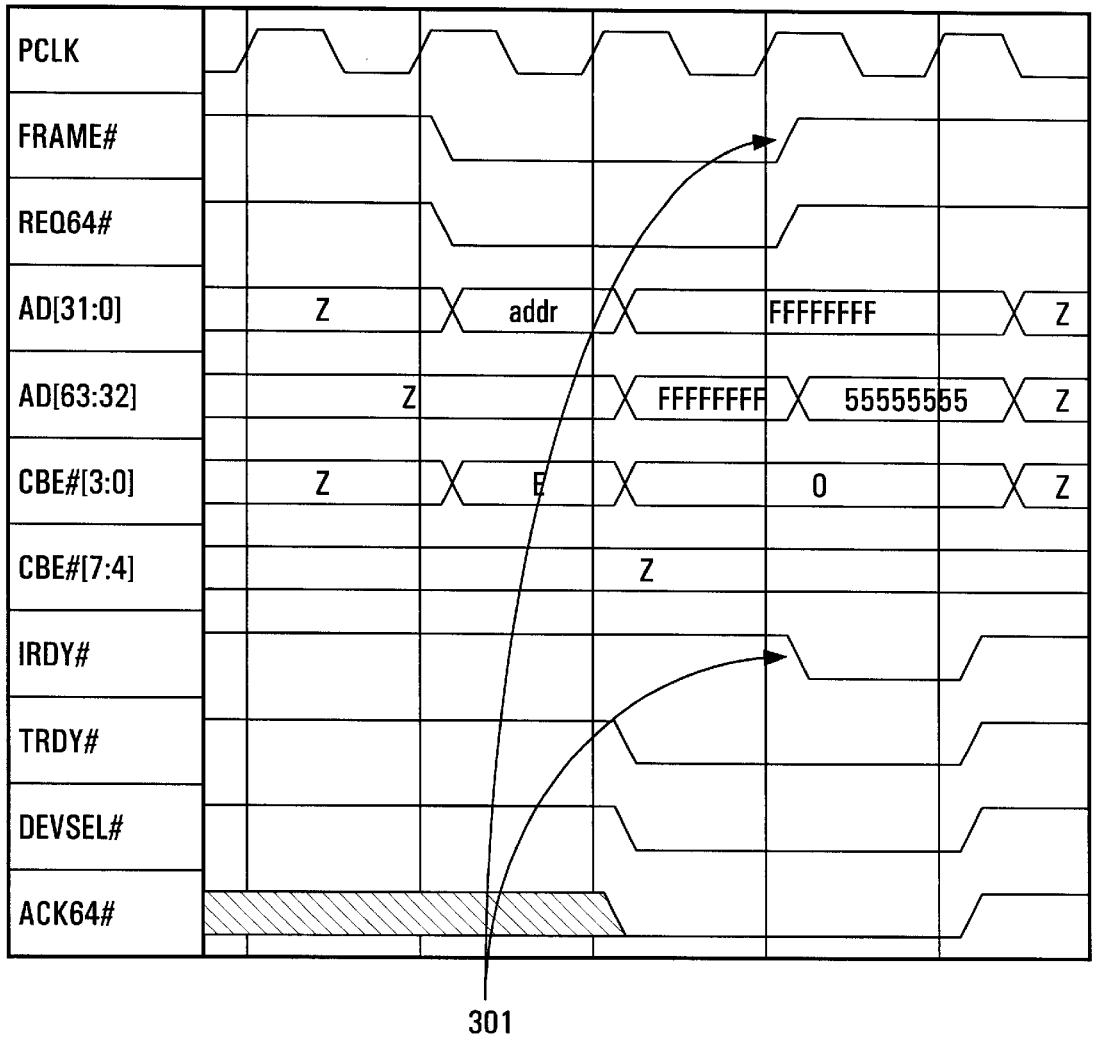
FIG. 3 shows a timing diagram of a 64-bit PCI initiator transferring a 64-bit data to a 64-bit target using the REQ64#, ACK64# protocol in accordance with the prior art.
Figure 4:
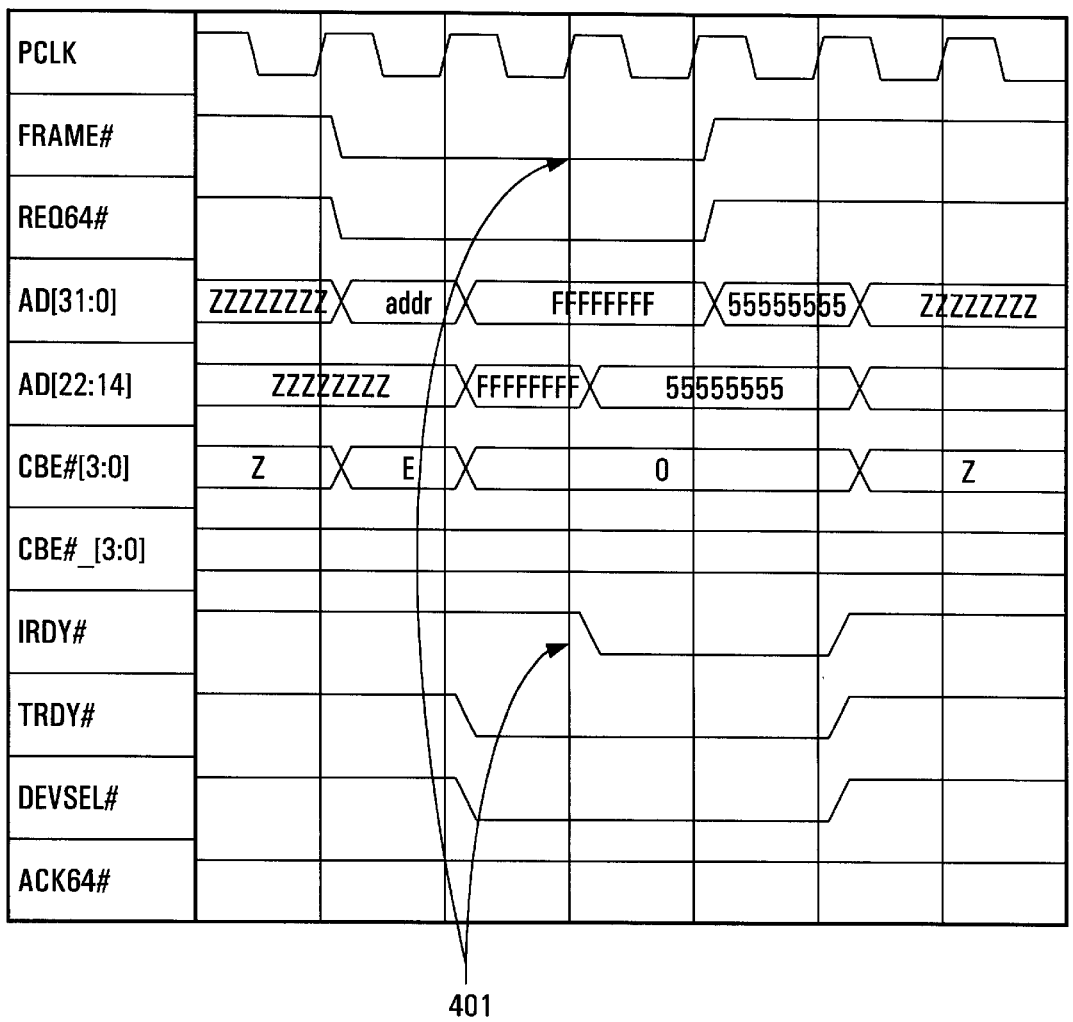
FIG. 4 shows a timing diagram of a 64-bit PCI initiator transferring a 64-bit data to a 32-bit target using the REQ64#, ACK64# protocol in accordance with the prior art.
Figure 5:
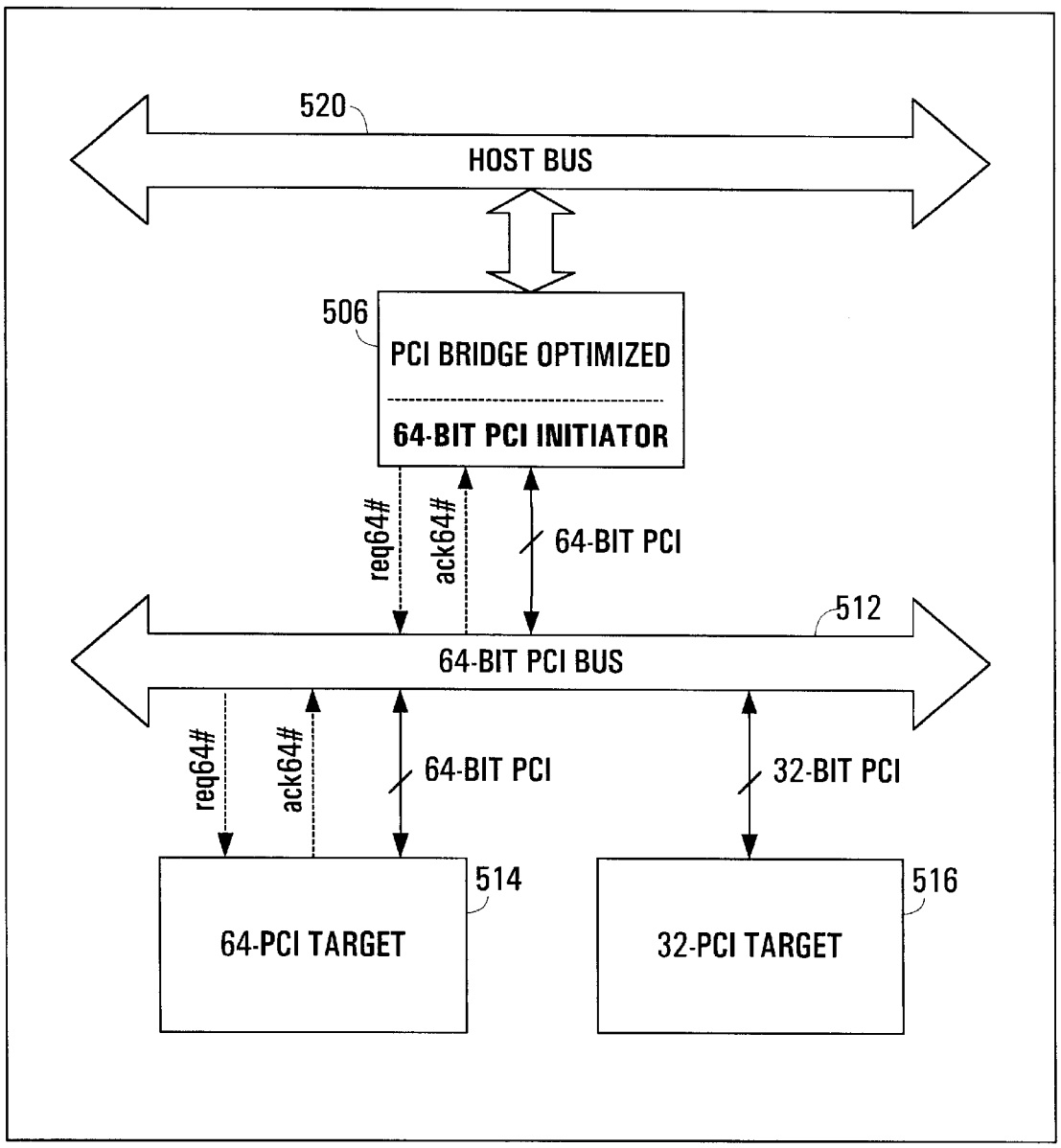
FIG. 5 shows a diagram of selected components of a 64-bit PCI bus architecture accordance with one embodiment of present invention.

Referring now to FIG. 5, a diagram 500 of a PCI bridge 506, a PCI bus 512, a PCI target 514, and a PCI target 516 in accordance with one embodiment of the present invention is shown. As depicted in diagram 500, PCI bus 512 is a 64-bit PCI bus (in accordance with PCI specification— Revision 2.1). PCI bus 512 hosts a mixed 32-bit and 64-bit PCI environment, wherein 64-bit PCI bridge 506 is a 64-bit PCI initiator device (hereafter referred to as 64-bit initiator 506), PCI target 514 is a 64-bit PCI device (hereafter referred to as 64-bit target 514), and PCI target 516 is a 32-bit PCI device (hereafter referred to as 32-bit target 516). As depicted in diagram 500, 64-bit initiator 506 functions as an optimized PCI bridge between a host bus 520 and PCI bus 512. As used herein, 64-bit initiator 506 is "optimized" in that it transfers 64-bit data in accordance with the method of the present invention as opposed to transferring 64-bit data in accordance with the PCI specifications.

For example, in accordance with the PCI specification, 64-bit PCI agents utilize a REQ64#-ACK64# bus negotiation protocol to determine if there exists 64-bit capable targets, in a mixed 32/64-bit environment, as depicted in diagram 500. This negotiation REQ64#-ACK64# protocol consumes clock cycles and hence reduces the throughput of the initiator device, particularly for single 64-bit transfers.

In contrast, the present invention optimizes the performance of 64-bit initiator devices (e.g., 64-bit initiator 506) by breaking up a single 64-bit data into two 32-bit data, and transferring them in successive clock cycles. This a process eliminates the REQ64#-ACK64# protocol negotiation between devices. The present invention leverages the fact that, in accordance with the PCI specification, all PCI compliant 64-bit targets should be able to handle 32-bit transfers. Thus, by breaking up a single 64-bit data into two 32-bit data and transferring them in successive clock cycles, and optimized 64-bit initiator in accordance with the present invention will transfer the single 64-bit data more efficiently regardless of whether the transfer is to a 32-bit target (e.g. 32-bit target 516) or a 64-bit target (e.g., 64-bit target 514).

Hence, in transferring a single 64-bit data, a 64-bit initiator in accordance with the present invention (e.g., 64-bit initiator 506) does not assert the REQ64# signal and does not wait for the ACK64# signal being asserted with DEVSEL# by the target device. Since the single 64-bit data is always transferred as two 32-bit data, 64-bit initiator 506 is not concerned whether the target device asserts ACK64# or not. In accordance with the PCI specification, if ACK64# is not asserted with DEVSEL#, the target device is a 32-bit device, where as if ACK64# is asserted with DEVSEL#, then the target device is a 64-bit device.

Referring still to FIG. 5, PCI initiator 506, in accordance with present invention, takes advantage of the fact that the REQ64#,ACK64# protocol complexities are unnecessary for a single 64-bit data transfer. Throughput can be greatly enhanced and performance and timing greatly improved by intelligently averting this protocol negotiation. A single 64-bit data transfer in accordance with the present invention averts the REQ64# ACK64# protocol negotiation for single 64-bit transfers by translating all single 64-bit transfers into two 32-bit transfers. A timing diagram of the data transfer method of the present invention is shown in FIG. 6 below.

Figure 6:
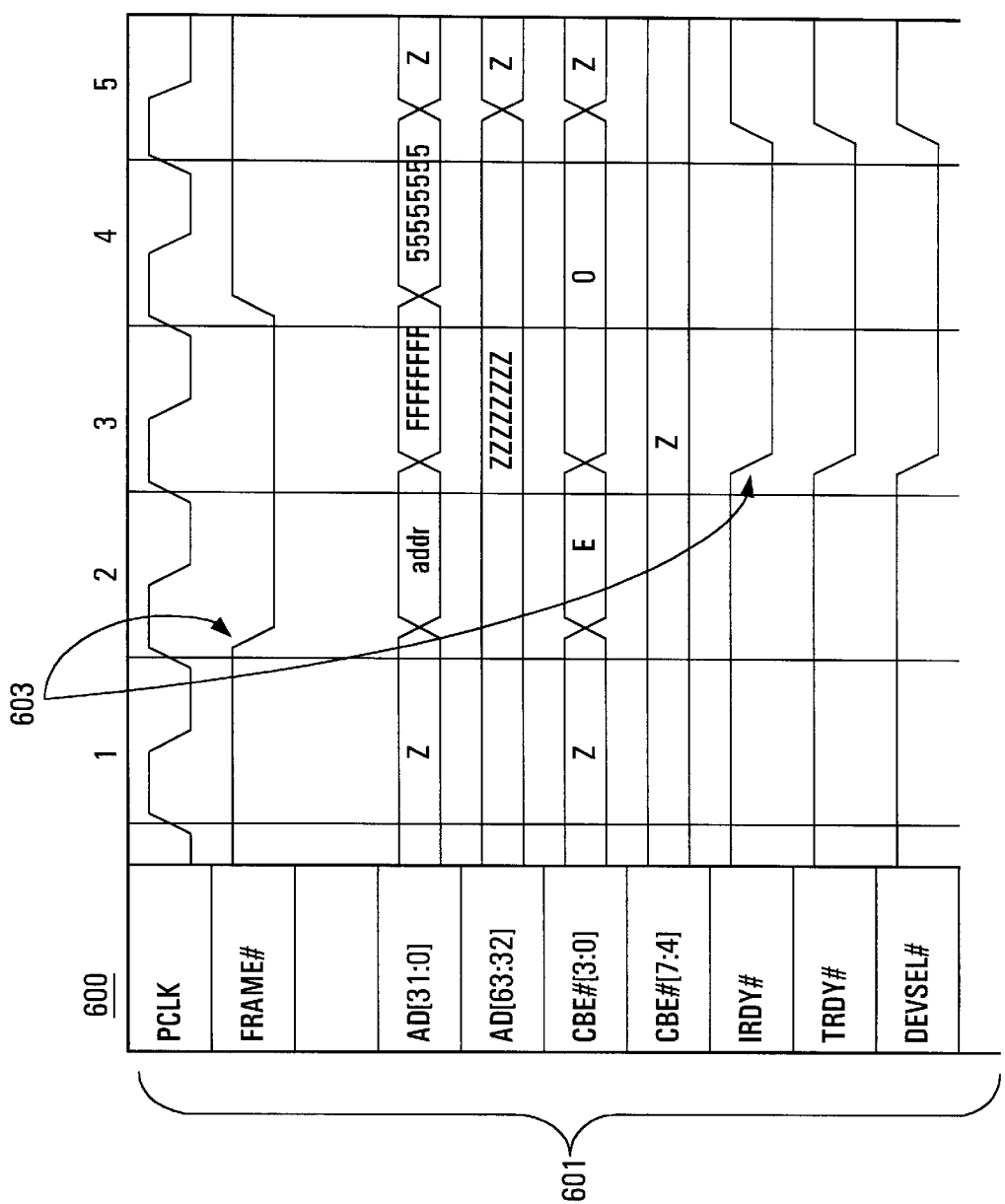
FIG. 6 shows a timing diagram of the data transfer from a 64-bit initiator in accordance with one embodiment of the present invention.

With reference now to FIG. 6, a timing diagram 600 of a data transfer from 64-bit initiator 506 in accordance with one embodiment the present invention shown. The left side of timing diagram 600 shows standard PCI signals 601, from top to bottom, PCLK through ACK64#. Clock cycles 1 through 5 are shown across the top of diagram 600.

As shown by diagram 600, regardless of whether the target device is 64-bit target 514 or 32-bit target 516, the single 64-bit data transfer from 64-bit initiator 506 always takes three clock cycles. As shown in diagram 600, 64-bit initiator 506 asserts FRAME# in clock cycle two, and transfers the first 32-bit data in clock cycle three with the assertion of IRDY#. The 64-bit initiator 506 merely samples TRDY# and DEVSEL# asserted by the addressed target device (either 64-bit target 514 or 32-bit target 516) in clock cycle three and immediately transfers the first 32-bit data (shown as "FFFFFFFF"), and in clock cycle 4, transfers the second 32-bit data (shown as "55555555").

Referring still to diagram 600 of FIG. 6, the 64-bit data transfer method of the present invention is based in part on the following facts:

First, the 64-bit initiator 506 is aware of the fact it has only one 64-bit data to transfer (either read or write). Hence 64-bit initiator 506 can assert IRDY# without any wait states in the clock cycle immediately after FRAME# is asserted, during a single address cycle command, as opposed to waiting for ACK64# to be asserted.

Second, the PCI specification requires that all off-chip PCI targets that are 64-bit capable should be able to decode 32-bit transfer cycles. Hence, translating a 64-bit transfer to two 32-bit transfers should be transparent to the 32-bit target, the 516 and other 32-bit targets and/or 64-bit targets in the system.

Third, the higher order busses (AD[63:321], CBE#[7:4]) and the REQ54# and ACK64# are tristated (as shown by the letter "Z" ) and hence, results in considerable power savings.

Additionally, data transfers as described above provide additional advantages to the system incorporating a 64-bit PCI initiator being optimized in accordance with present invention. For example, 64-bit initiator 506 exhibits a predictable deterministic behavior in a mixed 64-bit/32-bit PCI environment. Since all single 64-bit data transfers require only three clock cycles, performance of 64-bit initiator 506 is deterministic and predictable, facilitating its incorporation into larger, more complex systems. It should be noted that transfers of single 64-bit data requires only three clock cycles to complete, irrespective of whether the target is a 32-bit device or a 64-bit device. Data transfers in accordance with the present invention present significant power savings due to the fact that AD[64:32], CBE#[7:4], REQ64# and ACK64# do not toggle/change values.

Further, it should be noted that the optimization of the present invention greatly reduces state machine complexities within 64-bit initiators in accordance with present invention. Less complex state machine implementation makes the optimization of the present invention more easily incorporated into pre-existing initiator designs. Since the optimization does not impact the performance of 32-bit devices, the design of the optimization extends itself to reuseability in a "pure" 32-bit PCI environment. Accordingly, in the present embodiment, the optimization design for 64-bit initiator 506 is implemented in HDL for easy incorporation into PCI based ASIC devices. Additionally, the design of the optimization is compatible with PCI specifications.

Figure 7:
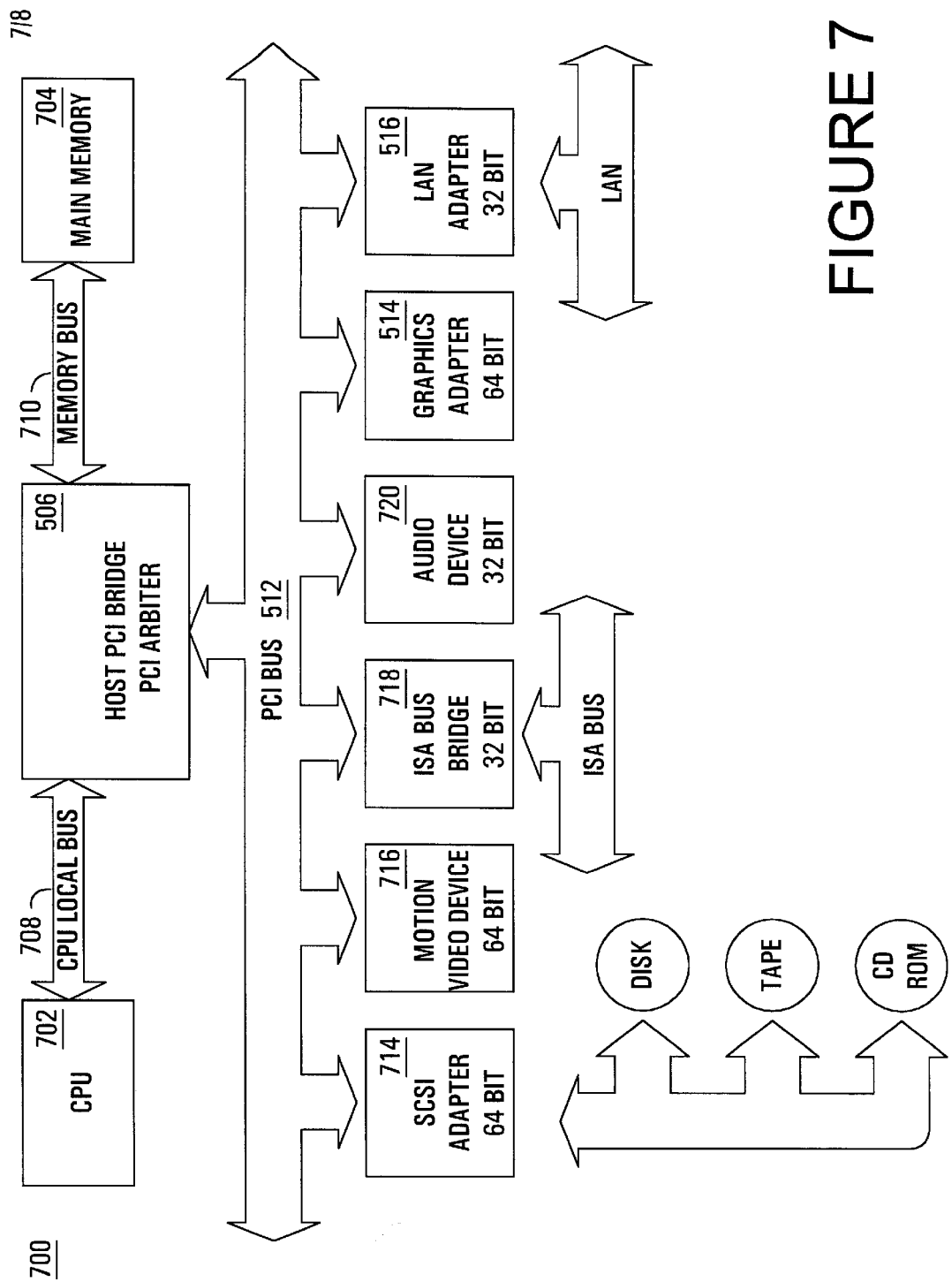
FIG. 7 shows a 64-bit PCI bus based computer system in accordance with one embodiment of present invention.

Referring now to FIG. 7, a PCI based computer system 700 in accordance with one embodiment of the present invention show. Computer system 700 incorporates a host PCI bridge/PCI arbiter implemented using the 64-bit PCI bridge initiator 506 from FIG. 5. The 64-bit PCI target 514 implements a graphics adapter. The 32-bit target 516 implements a LAN adapter. SCSI adapter 714 and motion video device 716 are 64-bit PCI devices. ISA bus bridge 718 and audio device 720 are 32-bit devices.

Thus, computer system 700 is implemented with a mixed 64-bit/32-bit PCI environment. The host PCI bridge/PCI arbiter 506 interacts with and transfers data to and from the 64-bit devices and the 32-bit devices coupled to PCI bus 512 using the optimized data transfer method described above. Accordingly, computer system 700 realizes increased data transfer band with across PCI bus 512. The I/O Performance of computer system 700 is more deterministic, as described above, and the devices communicating via PCI bus 512 consume less power.

Figure 8:
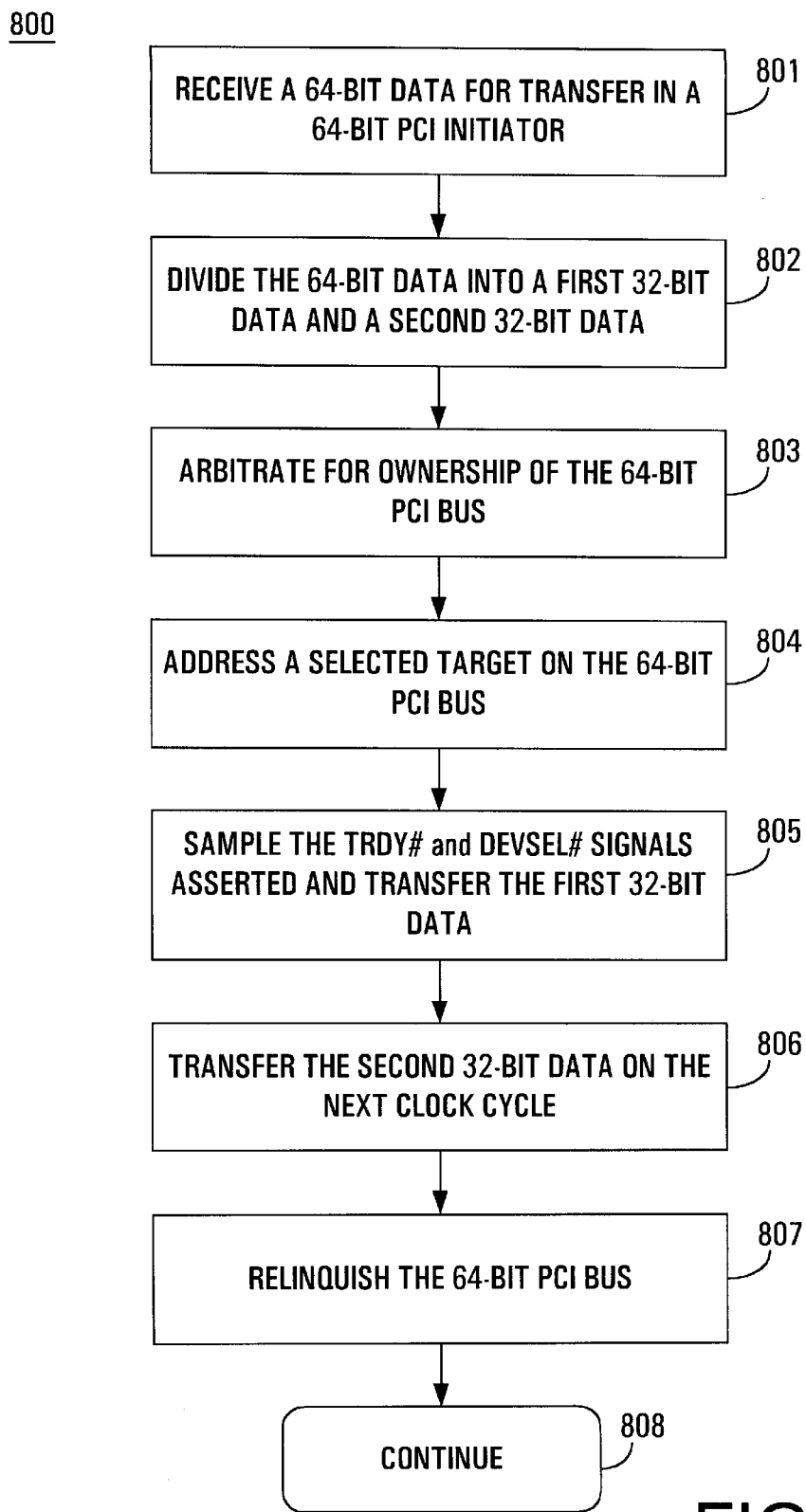
FIG. 8 shows a flowchart of the steps of a data transfer process in accordance with one embodiment of present invention.

With reference now to FIG. 8, a flowchart of the steps of a process 800 in accordance with one embodiment of the present invention shown. As depicted in FIG. 8, process 800 shows the operating steps of a 64-bit PCI initiator (e.g., 64-bit initiator 506 shown in FIG. 5) performing a data transfer in accordance with one embodiment of the present invention, wherein a single 64-bit data is broken into first and second 32-bit data for transfer in successive clock cycles.

Process 800 begins in step 801, where a single 64-bit data is received for transfer by a 64-bit PCI initiator in accordance with one embodiment of present invention (e.g., 64-bit initiator 506). As described above, the single 64-bit data is received from, for example, an internal device included within the 64-bit initiator 506. The 64-bit initiator 506 is coupled to a 64-bit PCI bus (e.g., 64-bit PCI bus 512) hosting a mixed 64-bit/32-bit PCI environment.

In step 802, 64-bit initiator 506 divides the 64-bit data into a first 32-bit data in the second 32-bit data. In the present embodiment, this division occurs internally, entirely within the 64-bit initiator 506. The division is completely transparent to other devices coupled to 64-bit PCI bus 512.

In step 803, 64-bit initiator 506 arbitrates for ownership of the 64-bit PCI bus 512. Using well-known PCI protocols, 64-bit initiator 506 arbitrates for and receives ownership (e.g., receives a GNT# signal) of the 64-bit PCI bus 512.

In step 804, 64-bit initiator 506 addresses a select target on the 64-bit PCI bus. As described above, in accordance with the present invention, the 64-bit initiator 506 utilizes the same optimized data transfer method regardless of whether the select target is a 64-bit target or a 32-bit target.

In step 805, 64-bit initiator 506 samples TRDY# and DEVSEL# signals asserted by the select target and transfers the first 32-bit data. As described above, 64-bit PCI initiator 506 does not engaged in the REQ64# ACK64# protocol. Since 64-bit PCI initiator 506 realizes that the current data transfer is only a single 64-bit data transfer, the initiator does not assert REQ64# and does not sample ACK64#. This holds true regardless of whether the selected target is a 64-bit target or a 32-bit target.

Referring still to process 800 of FIG. 8, in step 806, 64-bit initiator 506 transfers the second 32-bit data on the next clock cycle. As shown in timing diagram 600 of FIG. 6, the first 32-bit data in the second 32-bit data are transferred in successive clock cycles without the inclusion of any intervening wait states. In so doing, the present invention leverages the fact that, in accordance with the PCI specification, all PCI compliant 64-bit targets should be able to handle 32-bit transfers. Thus, by breaking up a single 64-bit data into two 32-bit data and transferring them in successive clock cycles, 64-bit initiator 506 transfers the 64-bit data up to 40 percent faster than the prior art.

In step 807, 64-bit initiator 506 relinquishes control of 64-bit PCI bus 512. Upon transfer of the first 32-bit data, 64-bit initiator 506 deasserts FRAME# such that upon transfer of the second 32-bit data in the next clock cycle, 64-bit PCI bus 512 is relinquished to a next bus master.

Subsequently, as shown by step 808, process 800 continues, as 64-bit initiator 506 waits for another single 64-bit data to transfer (e.g., read or write).

Thus, the present invention provides a more efficient solution for transferring a 64-bit data in a mixed 64-bit/32-bit PCI environment. In accordance with present invention, the single 64-bit data is broken into a first and second 32-bit data, and transferred in two successive clock cycles. In so doing, the present invention allows more efficient transfers of 64-bit data from a 64-bit PCI initiator device to a 64-bit target device in a mixed 64-bit/32-bit PCI environment. Additionally, the present invention allows more efficient transfers from a 64-bit initiator device to a 32-bit target device in a mixed 64-bit/32-bit PCI environment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for optimizing the performance of a 64-bit PCI (peripheral component interconnect) initiator when transferring a 64-bit data via a 64-bit PCI bus, the method comprising steps of:
    a) receiving a single 64-bit data in a 64-bit PCI initiator for transfer via a 64-bit PCI bus;
    b) breaking the 64-bit data into a first 32-bit data and a second 32-bit data;
    c) initiating a data transaction with a target device by arbitrating for ownership of the 64-bit PCI bus;
    d) transferring the first 32-bit data to a target device via the 64-bit PCI bus;
    e) transferring the second 32-bit data to a target device via the 64-bit PCI bus; and
    f) completing the data transaction with the target device without asserting a REQ64# signal such that a REQ64# ACK64# protocol is avoided, enabling a more efficient completion of the data transaction.

2. The method of claim 1 wherein the single 64-bit data is received from an internal device within the 64-bit PCI initiator.

3. The method of claim 1 wherein the 64-bit PCI initiator includes a controller state machine configured for breaking the 64-bit data into the first 32-bit data and the second 32-bit data.

4. The method of claim 1 wherein the 64-bit PCI initiator performs step d) with a 32-bit target coupled to the 64-bit PCI bus without asserting a REQ64# signal.

5. The method of claim 1 wherein the 64-bit PCI initiator performs step d) with a 64-bit target coupled to the 64-bit PCI bus without asserting a REQ64# signal.

6. The method of claim 1 wherein the 64-bit PCI initiator performs step d) without sampling a ACK64# signal.

7. The method of claim 1 further including the steps of:
the 64-bit PCI initiator tristating AD[63:32] or driving a constant value when step d) is performed with a 64-bit target; and
the 64-bit PCI initiator tristating AD[63:32] or driving a constant value when step d) is performed with a 32-bit target.

8. The method of claim 1 further including the step of the 64-bit PCI initiator performing steps c), d), e) in accordance with PCI protocols.

9. In a computer system having a plurality of 32-bit PCI (peripheral component interconnect) devices and 64-bit PCI devices coupled to a 64-bit PCI bus in a mixed 64-bit/32-bit PCI environment, a method for optimizing the performance of a 64-bit PCI initiator when transferring a 64-bit data via the 64-bit PCI bus, the method comprising the 64-bit PCI initiator performing the steps of:
 a) receiving a single 64-bit data in a 64-bit PCI initiator for transfer via a 64-bit PCI bus;
 b) breaking the 64-bit data into a first 32-bit data and a second 32-bit data;
 c) initiating a data transaction with a target device by arbitrating for ownership of the 64-bit PCI bus;
 d) tristating AD[63:32] of the 64-bit PCI bus;
 e) transferring the first 32-bit data to a target device via the 64-bit PCI bus;
 f) transferring the second 32-bit data to a target device via the 64-bit PCI bus; and
 g) completing the data transaction with the target device without asserting a REQ64# signal such that a REQ64# ACK64# protocol is avoided, enabling a more efficient completion of the data transaction.

10. The method of claim 9 wherein the 64-bit PCI initiator is a bridge device coupled to a host bus and the 64-bit PCI bus and the single 64-bit data is received from a device on the host bus.

11. The method of claim 9 wherein the 64-bit PCI initiator includes a controller state machine configured for breaking the 64-bit data into the first 32-bit data and the second 32-bit data.

12. The method of claim 9 wherein the 64-bit PCI initiator performs step e) and step f) with a 32-bit target coupled to the 64-bit PCI bus without asserting a REQ64# signal.

13. The method of claim 9 wherein the 64-bit PCI initiator performs step e) and step f) with a 64-bit target coupled to the 64-bit PCI bus without asserting a REQ64# signal.

14. The method of claim 9 wherein the 64-bit PCI initiator performs step g) without sampling a ACK64# signal.

15. The method of claim 9 wherein the 64-bit PCI bus hosts a mixed 32-bit/64-bit PCI environment.

16. In a computer system having a plurality of 32-bit PCI (peripheral component interconnect) devices and 64-bit PCI devices coupled to a 64-bit PCI bus in a mixed 64-bit/32-bit PCI environment, a data transfer optimized 64-bit PCI initiator comprising:
 a 64 bit PCI initiator coupled to the 64 bit PCI bus, the 64 bit PCI initiator including a controller state machine adapted to cause the 64 bit PCI initiator to implement an optimized data transfer method for transferring a single 64 bit data, the method comprising the steps of:
 a) receiving the single 64-bit data in the 64-bit PCI initiator for transfer via the 64-bit PCI bus;
 b) breaking the 64-bit data into a first 32-bit data and a second 32-bit data;
 c) initiating a data transaction with a target device by arbitrating for ownership of the 64-bit PCI bus;
 d) tristating AD[63:32] of the 64-bit PCI bus;
 e) transferring the first 32-bit data to a target device via the 64-bit PCI bus;
 f) transferring the second 32-bit data to a target device via the 64-bit PCI bus; and
 g) completing the data transaction with the target device without asserting a REQ64# signal such that a REQ64# ACK64# protocol is avoided, enabling a more efficient completion of the data transaction.

17. The 64-bit PCI initiator of claim 16 wherein the 64-bit PCI initiator is a bridge device coupled to a host bus and the 64-bit PCI bus and the single 64-bit data is received from a device on the host bus.

18. The 64-bit PCI initiator of claim 16 wherein the 64-bit PCI initiator includes a controller state machine configured for breaking the 64-bit data into the first 32-bit data and the second 32-bit data.

19. The 64-bit PCI initiator of claim 16 wherein the 64-bit PCI initiator performs step e) and step f) with a 32-bit target coupled to the 64-bit PCI bus without asserting a REQ64# signal and without sampling a ACK64# signal.

20. The 64-bit PCI initiator of claim 16 wherein the 64-bit PCI initiator performs step e) and step f) with a 64-bit target coupled to the 64-bit PCI bus without asserting a REQ64# signal.

* * * * *